No. 804,414. PATENTED NOV. 14, 1905.
C. W. LARSON.
BRAKE MECHANISM.
APPLICATION FILED MAR. 28, 1904.

Witnesses:
George H. Tilden
Helen Alford

Inventor:
Carl W. Larson.
by Albert B. Davis
Att'y.

UNITED STATES PATENT OFFICE.

CARL W. LARSON, OF SCHENECTADY, NEW YORK, ASSIGNOR TO GENERAL ELECTRIC COMPANY, A CORPORATION OF NEW YORK.

BRAKE MECHANISM.

No. 804,414.          Specification of Letters Patent.          Patented Nov. 14, 1905.

Application filed March 28, 1904. Serial No. 200,290.

*To all whom it may concern:*

Be it known that I, CARL W. LARSON, a citizen of the United States, residing at Schenectady, county of Schenectady, State of New York, have invented certain new and useful Improvements in Brake Mechanism, of which the following is a specification.

It is frequently desirable to provide a brake mechanism which, while opposing no resistance to the rotation of a shaft in one direction, will operate automatically to prevent rotation of the shaft in the opposite direction.

The object of my present invention is the provision of a simple and efficient brake mechanism of the character above noted.

The various features of novelty which characterize my invention are pointed out with particularity in the claims annexed to and forming a part of this specification. For a better understanding of my invention, however, reference may be had to the accompanying description and drawings, in which I have described and illustrated one embodiment of my invention.

Figure 1:
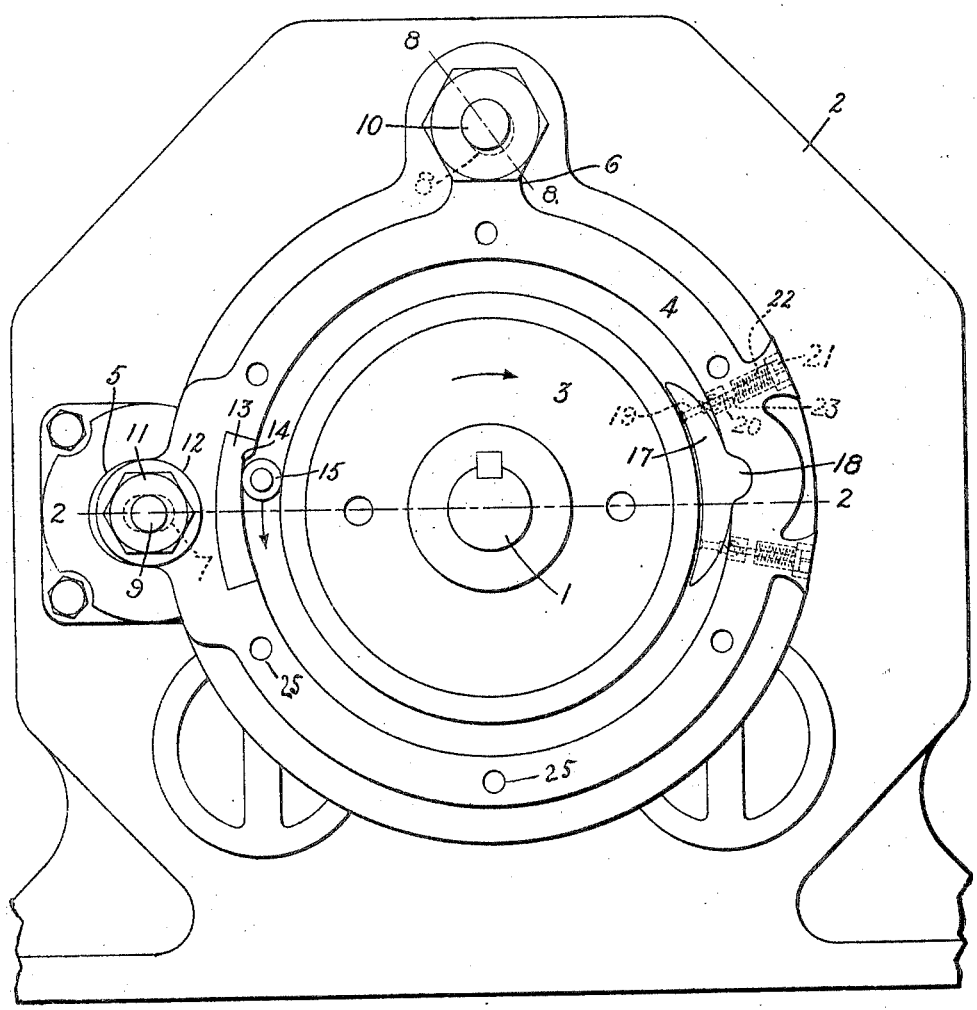
Figure 2:
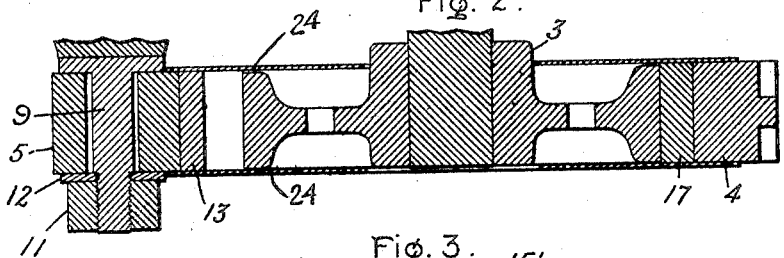
Figure 3:
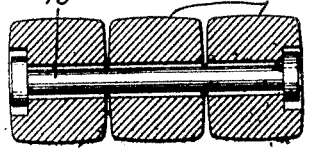

Of the drawings, Figure 1 is an end elevation of an electric motor equipped with my invention, the front cover-plate being removed. Fig. 2 is a partial sectional plan taken on the line 2 2 of Fig. 1, and Fig. 3 is an enlarged sectional elevation showing the assembled friction-rolls.

Referring to the drawings, 1 represents a shaft the rotation of which is to be controlled. In the embodiment of my invention shown in the drawings, 1 represents the armature-shaft of an electric motor 2. A brake wheel or drum 3, having a cylindrical outer periphery, is keyed to the shaft 1. A brake ring or frame 4, which may be formed of cast-iron, surrounds the brake-wheel 3, with which it is substantially concentric. The inner diameter of the brake ring or frame 4 is somewhat greater than the outer diameter of the wheel 3. The brake-ring 4 is provided with two outwardly-extending lugs 5 and 6, which are about ninety degrees apart. Apertures or slots 7 and 8 (shown in dotted lines in Fig. 1) are formed in the lugs 5 and 6, respectively. The aperture 7 is elongated in the direction of the line 2 2, and the aperture 8 is elongated in the direction of the line 8 8. Supporting bolts or studs 9 and 10, carried by the motor-frame, pass through the apertures 7 and 8, respectively. The stud 9 is formed with a shoulder at its inner end, against which the inner side of the brake-ring 4 bears. This construction is clearly shown in Fig. 2. The stud 10 is similar to stud 9 in construction. To hold the frame 4 on the bolts 9 and 10, nuts 11 are threaded on their outer ends. It will of course be understood that suitable washers 12 may be employed between the outer face of the brake-ring and the nuts 11. This construction allows a limited movement of the frame 4 with respect to its support.

A block 13, preferably formed of hardened steel, is secured in a recess formed for the purpose in the inner left-hand side of the brake-ring 4, as viewed in Fig. 1. The ends of the block are substantially flush with the inner periphery of the ring. The inner surface of the block 13, however, is not cylindrical about the shaft 1 as an axis, a recess being formed in its face which terminates at the upper end of the block in a shoulder 14 and tapers from the bottom of the shoulder to the lower end of the block. This results in the formation of a wedge-shaped or tapered space between the inner face of the block 13 below the shoulder 14 and the outer periphery of the brake-wheel 3. In this space is located a rolling member 15, which in the construction illustrated comprises a number of more or less resilient rolls or rings 15', held together by a bolt or rivet 16. The rings 15', which are clearly shown in section in Fig. 3, are preferably formed of hardened steel and are loosely or flexibly connected together by the rivet or bolt 16, which is smaller in diameter than the holes through the rings and lies parallel to the shaft 1.

The frame 4 carries at the right of the shaft 1 a braking-surface, which may be the inner face of a brake-shoe 17. The inner face of the brake-shoe 17 is curved to fit the outer periphery of the brake-wheel 3. A semicylindrical lug 18, formed on the outer side of the brake-shoe 17, fits in a recess formed to receive it in the inner side of the brake-frame 4. This construction allows a limited rocking movement of the brake-shoe 17 with respect to the frame 4 about an axis parallel to the shaft 1.

In order to normally hold the brake-shoe 17 in the position shown in Fig. 1, eyebolts 19 are secured to the shoe 17 near its ends. The outer ends of these bolts are connected to the inner ends of bolts 20, which are located in radial passages or recesses formed for the purpose in the frame 4. Nuts 21 are carried by the bolts 20 near their outer ends. Helical compression-springs 22 extend between the inner sides of the nuts 21 and shoulders or abutments 23 formed for the purpose in the frame 4. Suitable cover-plates 24 are secured to the front and back sides of the ring 4 by screws or bolts passing through apertures 25.

When the motor 2 is in operation, the shaft 1 rotates in the direction shown by the curved arrow in Fig. 1. Under these circumstances the brake mechanism assumes the position shown in Fig. 1. The upper end wall of the slot 8, which is inclined to the vertical, as shown, with its lower end extending toward the brake-shoe, then bears against the stud 10. The parts are so constructed that under these circumstances a small amount of clearance will exist between the wheel 3 and the brake-shoe 17. The rolls 15 are so proportioned that the rotation of the wheel 3 in the direction of the curved arrow carries them into the position shown in Fig. 1. If for any reason the shaft 1 starts to reverse its direction of rotation, the rings 15 will immediately move downward in the direction indicated by the small arrow in Fig. 1 in the narrow end of the space between the block 13 and the brake-wheel 3. This will tend to wedge the brake-ring 4 to the left, as seen in Fig. 1. As the aperture 7 is elongated in the direction 2 2, this motion of the ring 4 will at first be practically unopposed. A very slight movement of the ring 4 will, however, bring the brake-shoe 17 into operative contact with the periphery or braking-surface of the wheel or drum 3. As the brake-shoe 17 and the wheel 3 lock together the frame 4 will rock about the stud 9 as an axis until the stud 10 engages the lower end wall of the elongated slot 8. When this takes place, the shaft 1 will lock firmly against rotation. When the shaft 1 starts to rotate in the direction indicated by the curved arrow in Fig. 1, the frame 4 will be immediately moved to the right by the engagement of the stud 10 with the lower inclined wall of the slot 8. The drum will thus be instantly disengaged from the frame.

By employing a number of rolls or rings 15' instead of one long frictional roll a greater freedom of motion is obtained and no difficulties are experienced from the binding of one end of the rolling member between the block 13 and the face of the disk 3. The elasticity of the rings insures substantial equality of pressure upon the rings. Moreover, with the construction employed a mechanism is obtained which is practically silent in operation.

The brake mechanism which I have described is useful in many different relations, and I do not intend the claims hereinafter made to be limited to any particular use. I may mention, however, that the invention is particularly useful in connection with the electric motors operating hoisting-winches, where, as is well known, the hoisting-drum is frequently rotated in one direction only. With my brake mechanism backward rotation of the armature-shaft is impossible and no evil consequences can result from interruption of the motor-circuit through accident or otherwise.

What I claim as new, and desire to secure by Letters Patent of the United States, is—

1. In combination, a drum or wheel, a coöperating brake-shoe therefor, a member provided with a surface separated from said drum or wheel by a wedge-shaped space, a movable member jammed or wedged into said space by the rotation of the drum in one direction to displace said surface, and means for causing the displacement of said surface to force the brake-shoe against the drum or wheel.

2. In combination, a rotating drum or wheel, a frame in proximity thereto, said frame being provided with a braking-surface and a member provided with a surface separated from the drum or wheel by a wedge-shaped or tapered space, a member adapted to be wedged in said space to displace said second surface, and means for causing the displacement of said second surface to bring about an operative engagement between the drum or wheel and the braking-surface.

3. In combination, a drum or wheel, an annular frame surrounding said drum or wheel, said frame being provided with a braking-surface and a member provided with a surface separated from the frame or wheel by a wedge-shaped or tapered space, said surfaces being substantially diametrically opposed to each other, and a member adapted to be wedged between said drum or wheel and said second surface to displace the frame and move the braking-surface into engagement with the drum or wheel.

4. In combination, a drum or wheel, a support, a frame provided with a braking-surface, means connecting the frame and support, said means allowing a limited movement of said frame, and means operated automatically by the rotation of said drum or wheel in one direction to bring said frame into braking connection with said wheel or drum.

5. In combination, a shaft provided with a braking-surface, a frame member surrounding said shaft and provided with a coöperating braking-surface, a supporting member by which said frame member is supported by means comprising a pin carried by one of said members which engages a slot inclined to the vertical formed in the other of said members, the parts being so arranged that the pin normally bears against one of the end walls of the slot under the action of gravity on the frame with said coöperating braking-surface out of engagement with the first-mentioned braking-surface.

6. In combination, a horizontal shaft provided with a cylindrical braking-surface, a supporting member, a frame member provided with a braking-surface at one side of said shaft, in proximity to the first-mentioned braking-surface, a connection between the frame member and the supporting member at the other side of said shaft comprising a pin carried by one of said members and a slot extending radially to said shaft in the other of said members, and a connection between the supporting member and the frame member above the shaft comprising a pin carried by one of said members and a slot formed in the other said member, said slot being inclined to the vertical with its lower end extended toward said braking-surface.

7. In combination, a shaft provided with a cylindrical braking-surface, a supporting member, a frame member provided with a braking-surface, connections between said frame member and said supporting member allowing a limited movement of the frame member relative to the supporting member, said connections between said frame member and said supporting member being such that the said braking-surface is normally held out of contact with the first-mentioned braking-surface, and means for automatically moving the frame member to cause an engagement between the two braking-surfaces when the shaft starts to revolve in one direction.

8. In combination, a shaft provided with a cylindrical braking-surface, a frame provided with a braking-surface located at one side of the shaft and coöperating with the first-mentioned braking-surface and with a second surface located at the other side of the shaft and separated from the braking-surface by a tapered or wedge-shaped space, and a roller member located in said tapered or wedge-shaped space.

9. In combination, a shaft provided with a cylindrical braking-surface, a frame provided with a braking-surface located at one side of said shaft and coöperating with the first-mentioned braking-surface, and with a second surface located at the other side of said shaft, and separated from the cylindrical braking-surface by a tapered space, and a resilient roller member located in said tapered space.

10. In combination, a shaft provided with a cylindrical braking-surface, a frame provided with a braking-surface located at one side of said shaft and coöperating with the first-mentioned braking surface, and with a second surface located at the opposite side of said shaft and separated from the cylindrical braking-surface by a tapered space, and a roller member located in said tapered space, said roller member comprising a number of resilient rings flexibly connected together.

11. In combination, a shaft provided with a cylindrical braking-surface, a frame provided with a braking-surface located at one side of said shaft and coöperating with the first-mentioned braking-surface and with a second surface located at the opposite side of said shaft and separated from the cylindrical braking-surface by a tapered space, and a roller member comprising a number of resilient rings located in said tapered space.

In witness whereof I have hereunto set my hand this 25th day of March, 1904.

CARL W. LARSON.

Witnesses:
EDWARD WILLIAMS, Jr.,
HELEN ORFORD.